(12) United States Patent
Soboil et al.

(10) Patent No.: US 10,685,409 B2
(45) Date of Patent: Jun. 16, 2020

(54) PROVIDING CONTROLLED ACCESS TO PROPRIETARY FISHERIES DATA

(71) Applicant: Backtracker, Inc., Weymouth, MA (US)

(72) Inventors: Mark Soboil, Devonport (NZ); Michael Carroll, Charlestown, MA (US)

(73) Assignee: LEGIT FISH COMPANY, Boston, MA (US)

( * ) Notice: Subject to any disclaimer, the term of this patent is extended or adjusted under 35 U.S.C. 154(b) by 507 days.

(21) Appl. No.: 15/319,548

(22) PCT Filed: Jun. 16, 2014

(86) PCT No.: PCT/US2014/042532
§ 371 (c)(1),
(2) Date: Dec. 16, 2016

(87) PCT Pub. No.: WO2015/195077
PCT Pub. Date: Dec. 23, 2015

(65) Prior Publication Data
US 2017/0186106 A1    Jun. 29, 2017

(51) Int. Cl.
*G06Q 10/00* (2012.01)
*G06Q 50/02* (2012.01)
(Continued)

(52) U.S. Cl.
CPC ......... *G06Q 50/02* (2013.01); *G06F 21/6245* (2013.01); *G06Q 10/06315* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 6,567,792 B1 * | 5/2003 | Arnold | G06Q 30/02 705/50 |
| 7,376,601 B1 * | 5/2008 | Aldridge | G06Q 10/087 705/28 |

(Continued)

OTHER PUBLICATIONS

Roheim, Cathy, Seafood Supply Chain Management: Methods to Prevent Illegally-Caught Product Entry into the Marketplace, Jan. 7, 2008, Department of Environmental and Natural Resource Economics, University of Rhode Island, p. 1-23.*

(Continued)

*Primary Examiner* — Joseph M Waesco
(74) *Attorney, Agent, or Firm* — Grossman, Tucker, Perreault & Pfleger, PLLC (57) ABSTRACT

Systems and methods may be used to provide industry access to proprietary fisheries dependent data originating from fishers while preserving confidentiality rights of the fishers. An industry-accessible secured fisheries database is established to store proprietary fisheries dependent data, for example, received from a government fisheries database that collects fisheries dependent data in accordance with a fishery regulating authority. User interfaces may be established for database administrators and/or industry members to access the industry-accessible secured fisheries database. Application programming interfaces (APIs) may be established for interfacing with other software applications, for example, to transfer the fisheries dependent data into the industry-accessible secured fisheries database and/or to access the proprietary fisheries dependent data for purposes of traceability and/or verification of fish products. The industry-accessible secured fisheries database and the interfaces may use various security measures or techniques to preserve confidentiality rights of the fishers and while providing access to the proprietary data.

17 Claims, 7 Drawing Sheets

(51) Int. Cl.
*G06Q 10/06* (2012.01)
*G06Q 50/26* (2012.01)
*G06F 21/62* (2013.01)

(56) References Cited

U.S. PATENT DOCUMENTS

| | | | | |
|---|---|---|---|---|
| 8,055,589 | B2 * | 11/2011 | Saito | G06Q 20/3821 |
| | | | | 705/12 |
| 2002/0059053 | A1 * | 5/2002 | Akita | G06F 30/33 |
| | | | | 703/13 |
| 2004/0030741 | A1 * | 2/2004 | Wolton | G06F 16/954 |
| | | | | 709/202 |
| 2010/0049661 | A1 * | 2/2010 | Lima | A01K 11/001 |
| | | | | 705/318 |
| 2014/0122156 | A1 * | 5/2014 | Jung | G06Q 10/06313 |
| | | | | 705/7.23 |
| 2017/0206492 | A1 * | 7/2017 | Jung | G06Q 10/06313 |

OTHER PUBLICATIONS

Garcia, Serge, Food Security and Marine Capture Fisheries: Characteristics, Trends, Drivers, and Future Perspectives, 2010, Philosophical Transactions of The Royal Society, 365, 2869-2880, https://www.ncbi.nln.nih.gov/pmc/articles/PMC2935129/pdf/rstb20100171.pdf, p. 1-12.*

Rohm Phd, Cathy A., "Seafood Supply Chain Management: Methods to Prevent Illegally-Caught Product Entry into the Marketplace", IUCN World Conservation Union-US for the project Profish Law Enforcement, Corruption and Fisheries Work, Jan. 7, 2008, 23 pages, USA.

International Search Report and Written Opinion dated Apr. 3, 2015 in corresponding PCT Application No. PCT/US14/42532, 12 pgs.

* cited by examiner

PROVIDING CONTROLLED ACCESS TO PROPRIETARY FISHERIES DATA

CROSS-REFERENCE TO RELATED APPLICATIONS

The present application claims the benefit of U.S. Provisional Patent Application Ser. No. 61/835,324 filed Jun. 14, 2013, which is fully incorporated herein by reference.

TECHNICAL FIELD

The present invention relates to providing access to proprietary fisheries dependent data and more particularly, to providing industry access to proprietary fisheries dependent data while preserving confidentiality rights and using same to provide verification of supply chain data.

BACKGROUND INFORMATION

Various fishery regulating authorities, such as the National Marine Fisheries Service (NMFS) in the United States, require the reporting of fisheries dependent data from fishers such as a commercial fisherman. This data may be collected directly from the fisher or fishing vessel or from a first receiver (e.g., the dock or dealer) that first receives the fish from the fisher or vessel. Fisheries dependent data may include, for example, the name of the fisher, the identification of the vessel, the species and amount of fish brought abroad, the date, time, and location of the catch, and the fishery conditions, such as water temperature, depth, and salinity at the time the fish are brought aboard the fishing vessel. Fishers and/or first receivers may use electronic devices to record this fisheries dependent data and/or report the fishery dependent data to a government fisheries database. Fishers may also save and report Annual Catch Entitlement (ACE) data.

Certain fisheries dependent data is considered proprietary to the fisher who generated the data and the confidentiality rights of the fisher are protected, for example, under 50 C.F.R. 229.11 and 50 C.F.R. 600.405-600.425. The proprietary nature of fisheries dependent data and the need to protect confidentiality rights of the fishers is often at odds with the use of this data downstream by industry members, such as processors, wholesalers, retailers, restaurants, and fishery researchers. The proprietary fisheries dependent data may be helpful, for example, to trace a fish product back through a supply chain to identify the origins of the fish product (e.g., where the fish was caught and the methods used to catch the fish). The proprietary fisheries dependent data may also be helpful for supply chain entities, as the product is sold down the supply chain, to verify the authenticity of supply chain data identifying the fish product and its source. The traceability and verification of seafood products is becoming a legal and commercial necessity, but the protection of the proprietary information of the fishers, as well as the supply chain entities, is a significant challenge to performing these traceability and verification functions. The globalization of trade and the lack of international standards have also presented challenges to traceability and verification of seafood products.

BRIEF DESCRIPTION OF THE DRAWINGS

These and other features and advantages will be better understood by reading the following detailed description, taken together with the drawings wherein.

DETAILED DESCRIPTION

Systems and methods, consistent with embodiments of the present disclosure, may be used to provide industry access to proprietary fisheries dependent data originating from fishers while preserving confidentiality rights of at least the fishers. An industry-accessible secured fisheries database is established to store proprietary fisheries dependent data, for example, received from a government fisheries database that collects fisheries dependent data in accordance with a fishery regulating authority. The industry-accessible secured fisheries database may also store proprietary supply chain data received from supply chain entities. User interfaces may be established for database administrators and/or industry members to access the industry-accessible secured fisheries database. Application programming interfaces (APIs) may be established for interfacing with other software applications, for example, to transfer the fisheries dependent data into the industry-accessible secured fisheries database and/or to access the proprietary fisheries dependent data for purposes of traceability and/or verification of fish products. The industry-accessible secured fisheries database and the interfaces may use various security measures or techniques to preserve confidentiality rights of the fishers and others (e.g., supply chain entities) while providing access to the proprietary data.

As used herein, "fish" refers to any aquatic animal that is harvested including, without limitation, fin fish, mollusks, and crustaceans and "fisher" refers to the owner or operator of the vessel or gear used to harvest the fish. As used herein, "fisheries dependent data" refers to data collected directly or indirectly from fishers as a result of a fish harvesting operation and "proprietary fisheries dependent data" refers to fisheries dependent data that is proprietary to a fisher and protected as confidential under law or a regulation including, without limitation, 50 CFR 229.11 and 50 C.F.R. 600.405- 600.425. As used herein, "government reported fisheries data" refers to fisheries dependent data reported in accordance with a fishery regulating authority including, without limitation, NMFS, and "government fisheries database" refers to the database operated by a fishery regulating authority or an entity authorized by a fishery regulating authority to collect the government reported data in accordance with a fishery regulation. As used herein, "industry-accessible secured fisheries database" refers to a database that stores at least proprietary fisheries dependent data, that is accessible to industry members other than the fishers originating the data, and that uses one or more security measures (e.g., encryption and/or access control) to preserve confidentiality rights of at least the fishers associated with the data while providing access to that data.

Figure 1:
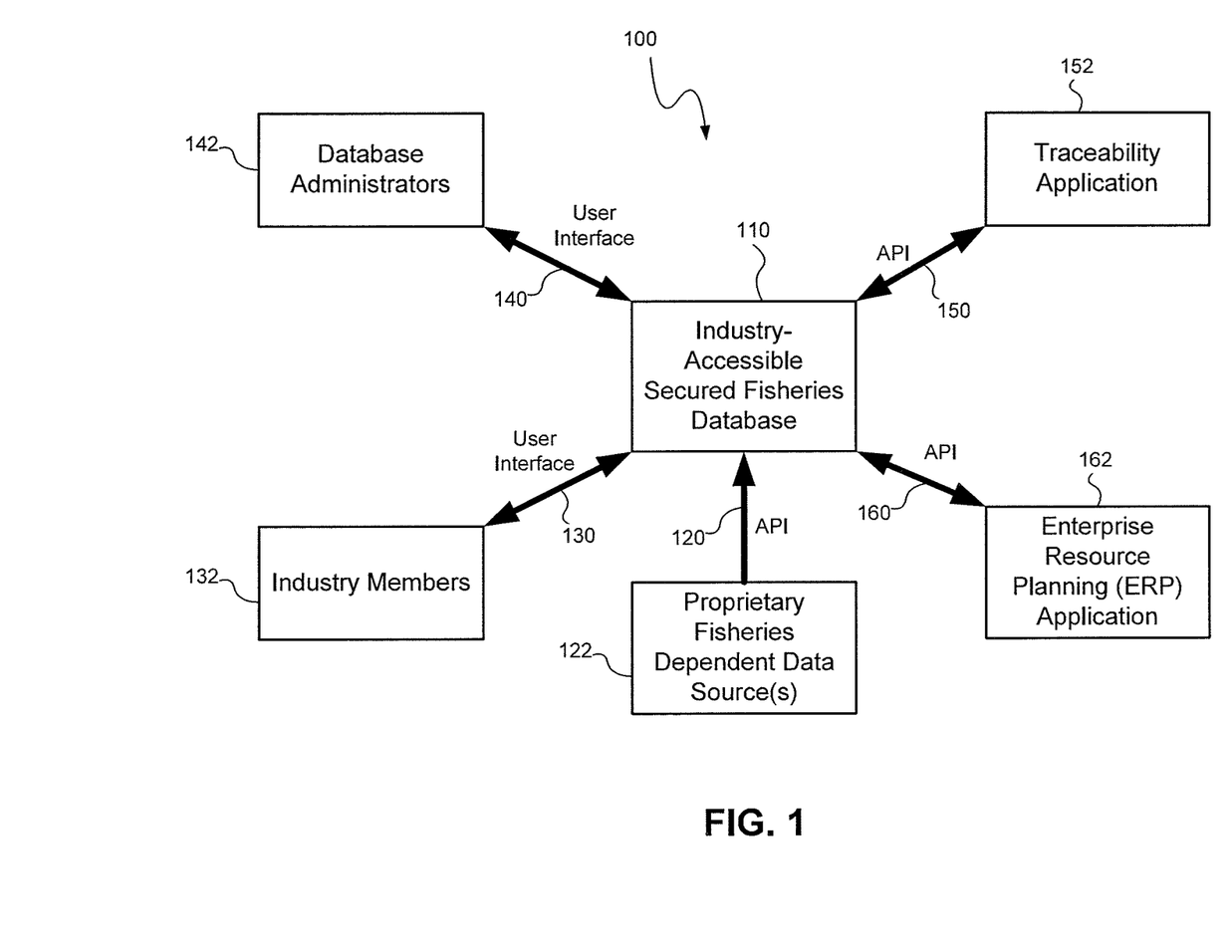
FIG. 1 is a schematic diagram of a system for providing industry access to proprietary fisheries dependent data while preserving confidentiality rights of fishers, consistent with embodiments of the present disclosure.
Figure 1A:
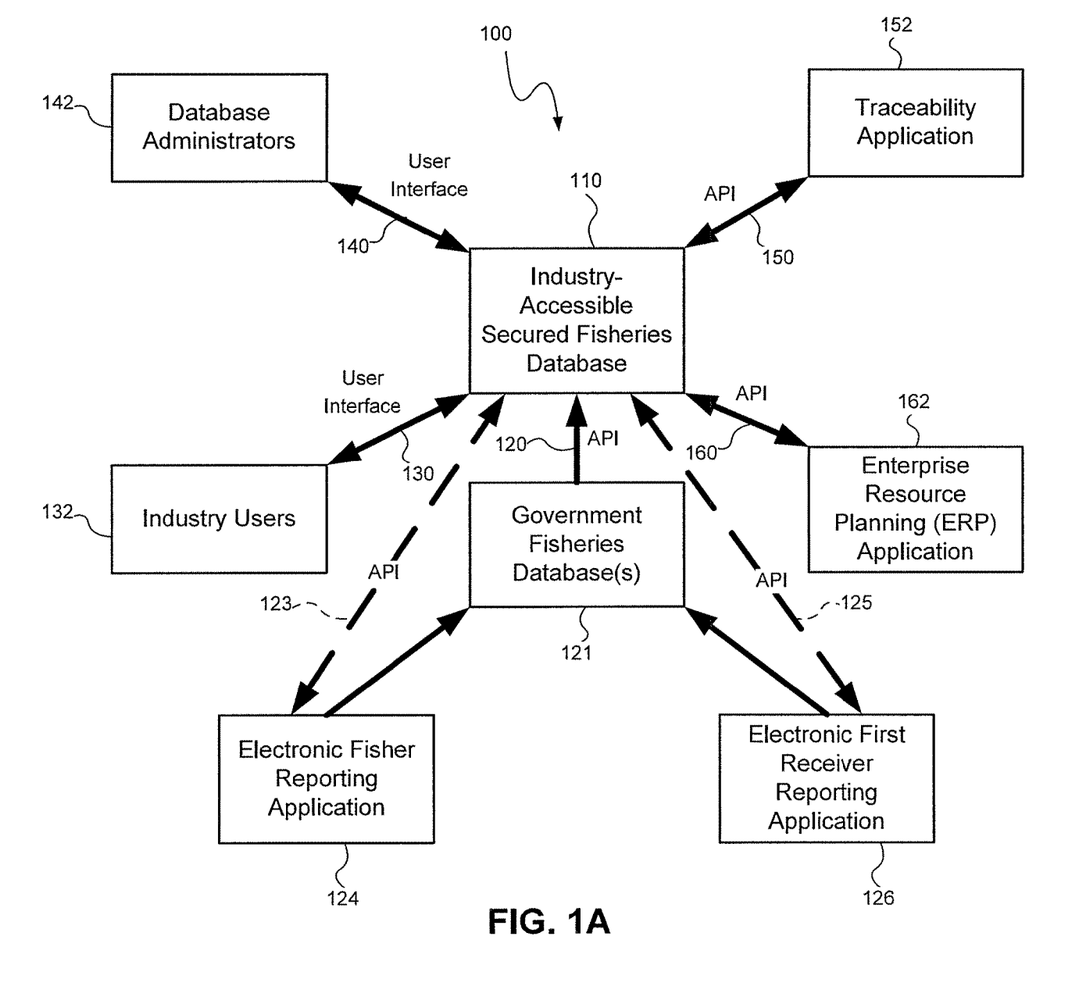
FIG. 1A is a schematic diagram of a system for providing industry access to proprietary fisheries dependent data collected from a government fisheries database while preserving confidentiality rights of fishers, consistent with embodiments of the present disclosure.

Referring to FIGS. 1 and 1A, a system 100 for providing industry access to proprietary fisheries dependent data while preserving confidentiality rights of the fishers, consistent with embodiments of the present disclosure, includes an industry-accessible secured fisheries database 110 and one or more interfaces 120, 130, 140, 150, 160 providing authorized and secure access to the database 110. The industry-accessible secured fisheries database 110 receives proprietary fisheries dependent data from one or more sources 122, for example, via an application programming interface (API) 120. The proprietary fisheries dependent data includes data reported by fishers in connection with catching, taking or harvesting fish. The industry-accessible secured fisheries database 110 stores and secures the proprietary fisheries dependent data, and the one or more interfaces 130, 140, 150, 160 provide secure access to the proprietary fisheries dependent data while preserving the confidentiality rights of the fishers.

The industry-accessible secured fisheries database 110 includes hardware and software for storing and managing data, such as one or more computer systems, one or more data storage devices, and database management system (DBMS) software. The industry-accessible secured fisheries database 110 may also use known database security measures, such as data encryption and access control, to secure the proprietary fisheries dependent data stored in the database 110. Various embodiments and implementations of the system 100 and the industry-accessible secured fisheries database 110 are described in greater detail below.

The proprietary fisheries dependent data sources 122 may include, without limitation, fishers or fishing vessels, first receivers of landed fish, government fisheries databases, and supply chain entities. The data sources 122 may connect to the industry-accessible secured fisheries database 110 via an API 120 for purposes of transferring the proprietary fisheries dependent data to the database 110. The proprietary fisheries dependent data may be encrypted during the transfer and may remain encrypted when stored in the database 110. An API is a specification of how software components interact with each other. An API may include, for example, a library with specifications for routines, data structures, object classes and variables that define the interaction between the software components. The data transfer API 120 defines interactions between software used by the industry-accessible secured fisheries database 110 and software used by the data sources 122 for purposes of effecting a data transfer.

As shown more specifically in FIG. 1A, one embodiment of the industry-accessible secured fisheries database 110 receives proprietary fisheries dependent data from one or more government fisheries databases 121. The government fisheries database 121 may include any database that stores fisheries dependent data that is reported in accordance with a fishery regulating authority. In one example, the government fisheries database 121 may include the database operated and maintained by the Atlantic Coastal Cooperative Statistics Program (ACCSP) for storing fisheries dependent data reported on the East Coast of the United States. The government fisheries database(s) 121 may include fisheries dependent data that is required to be reported by government regulations as well as other data. The fisheries dependent data is generally reported to the government fisheries database(s) 121 by the fisher that caught the fish or by the first receiver of the landed fish (e.g., a fish dealer on the docks).

The fisheries dependent data may be reported to the government fisheries database(s) 121 using various electronic reporting applications or systems, such as electronic fisher reporting applications 124 used by fishers to report fisheries dependent data and electronic first receiver reporting applications 126 used by first receivers (e.g., dealers) to report fisheries dependent data. The electronic fisher reporting applications 124 may include any application used by a fisher to report catch or landing data including, without limitation electronic logbook software, electronic fish landing docket applications, electronic trip ticket or trip reporting applications, and manual (i.e., paper) trip ticket reporting. The electronic first receiver reporting applications 126 may include any application used by a first receiver of landed fish to report landing data. Examples of fishery data reporting applications include the web-based applications implemented in the Standard Atlantic Fisheries Information System (SAFIS) created by ACCSP. The government reported fisheries data may then be imported from the government fisheries database 121 to the industry-accessible secured fisheries database 110 using the data transfer API 120.

In other embodiments, the fisheries dependent data may be transmitted by the fisher or first receiver directly to the industry-accessible secured fisheries database 110, for example, concurrent with reporting the data to the government fisheries database 121. The electronic fisher reporting application 124 and/or the electronic first receiver reporting application 126 may use an API 123, 125 to connect directly to the industry-accessible secured fisheries database 110. An API 123, 125 providing a direct connection between a reporting application 124, 126 and the industry-accessible secured fisheries database 110 may also be configured to validate credentials and access data (e.g., vessel data) in the industry-accessible secured fisheries database 110. Alternatively, a fisher or first receiver may use a user interface to store fisheries dependent data in the industry-accessible secured fisheries database 110, as described below.

The industry-accessible secured fisheries database 110 may also store data other than proprietary fisheries dependent data including, without limitation, user data for managing access to the database and supply chain data provided by supply chain entities, as will be described in greater detail below. The industry-accessible secured fisheries database 110 may also store Annual Catch Entitlement (ACE) data.

The industry-accessible secured fisheries database 110 and the interfaces 130, 140, 150, 160 may use various security measures to preserve confidentiality rights of the fishers and others (e.g., supply chain entities) while providing access to proprietary data. One security measure includes using data encryption techniques to encrypt the data stored in the database 110 and the data transferred to or from the database 110. Another security measure includes limiting or modifying the data that is provided to a user or third party application. Before the data is accessed, for example, the data may be modified to remove data elements (e.g., identities of the fishers) that might result in a violation of confidentiality rights. The data may also be aggregated and presented in a summary form to prevent identifying the owner of the data. In one example, the data may be aggregated and presented in accordance with the "Rule of 3," which provides that the summarized data must include data from at least three entities to prevent the entities from being identified from the summarized data.

Another security measure includes access control that limits a user's access to the database 110 and/or the proprietary data stored in the database 110. Access control may include using passwords and/or access tokens to limit access to authorized users. Access control may also include limiting access to data that does not violate confidentiality rights (e.g., aggregated data) and/or limiting access to proprietary data to users who agree to confidentiality terms (e.g., in an electronic agreement). Access control may be based on consent or authorization provided by the owners of the proprietary fisheries dependent data. The owners of the data may, for example, set access permissions to restrict access to proprietary data to specific users or third party applications and/or to different levels of access. The owners of the proprietary data may thus selectively control the security of their data for different users or third party applications by changing the access permissions. A user desiring access to proprietary data may also issue a request for an access token, which may be issued by the owner of the data to provide access to the proprietary data.

Another security measure may prevent or limit the modification of certain data stored in the industry accessible secured database 110. Users and third party applications may be prevented, for example, from altering the government reported data in the database 110. Users and third party applications may also be prevented from altering data entered or uploaded by other users. A further security measure may include preventing or limiting the ability of a user or third party application to save the data locally, for example, by deleting the data after the user or third party application disconnects from the database 110.

Any combination of the above security measures may be used as well as other security measures capable of allowing access to the proprietary fisheries dependent data while preserving confidentiality rights. The industry-accessible secured fisheries database 110 and the interfaces to that database 110 thus maintain control over the proprietary fisheries dependent data that is accessed by the users and third party applications to preserve the proprietary nature of the data.

User interfaces 130, 140 provide authorized users with secure access to the industry-accessible secured fisheries database 110. An industry member user interface 130 may be used by authorized industry members 132 to access the database 110 and an administration portal interface 140 may be used by authorized database administrators 140 to access the database 110. Industry members may include fishers, fishing vessels, first receivers, and other supply chain entities (e.g., processors, wholesalers, retailers, and restaurants). The user interfaces 130, 140 may be established, for example, using web based forms, as described in greater detail below. To maintain security and preserve the confidentiality of the fishers associated with the fisheries dependent data, the user interfaces 130, 140 may employ database access control measures such as password protection. The user interfaces 130, 140 may be used to access the database 110 both to obtain data and to store data. The user interfaces 130, 140 may be used, for example, to store proprietary fisheries dependent data in the database 110 and/or to manage the transfer of proprietary fisheries dependent data to the database 110 from a data source 122 via the data transfer API 120. The user interfaces 130, 140 may also be used by supply chain entities to store supply chain data in the database 110. The authorized industry members 132 may have limited authorization and limited access to certain types or forms of data (e.g., aggregated non-confidential data, data owned by the industry member, and/or data owned by fishers authorizing access). The authorized database administrator users 142 may have broader authorization and access to the database 110 for purposes of administering the database and multiple industry users of the database.

Application programming interfaces (APIs) 150, 160 provide secure access to the industry-accessible secured fisheries database 110 for third party software applications. In the embodiments described herein, the database access APIs 150, 160 define the interaction between software used by the industry-accessible secured fisheries database 110 and the third party software accessing the database 110. To maintain security and preserve the confidentiality rights of the fishers associated with the fisheries dependent data, the APIs may establish a secure connection only to authorized entities and any data accessed via the API may be encrypted. The database access APIs 150, 160 may be used to access the database 110 both to obtain data and to store data.

One embodiment of a database access API 150 may be used by a traceability application 152 to connect to the industry-accessible secured fisheries database 110 for accessing fisheries dependent data for purposes of traceability of seafood products. The traceability application 152 may include any application used by the seafood industry for traceability of seafood, such as a Fish Tale™ traceability application, a TraceRegister™ application, and/or a HarvestMark™ application.

Another embodiment of a database access API 160 may be used by an enterprise resource planning (ERP) application 162 to connect to the industry-accessible secured fisheries database 110 for accessing fisheries dependent data for purposes of verifying the authenticity of supply chain data related to the purchase and sales of fish products. The ERP application 162 may include any application used by seafood supply chain entities for business management including managing purchase and sales of fish products. The database access API 160 may also be used to store and/or access supply chain data in the industry-accessible secured fisheries database 110. The supply chain data may include proprietary supply chain data that is secured in the database 110, for example, using one or more security measures in the same way as the proprietary fisheries dependent data.

Figure 2:
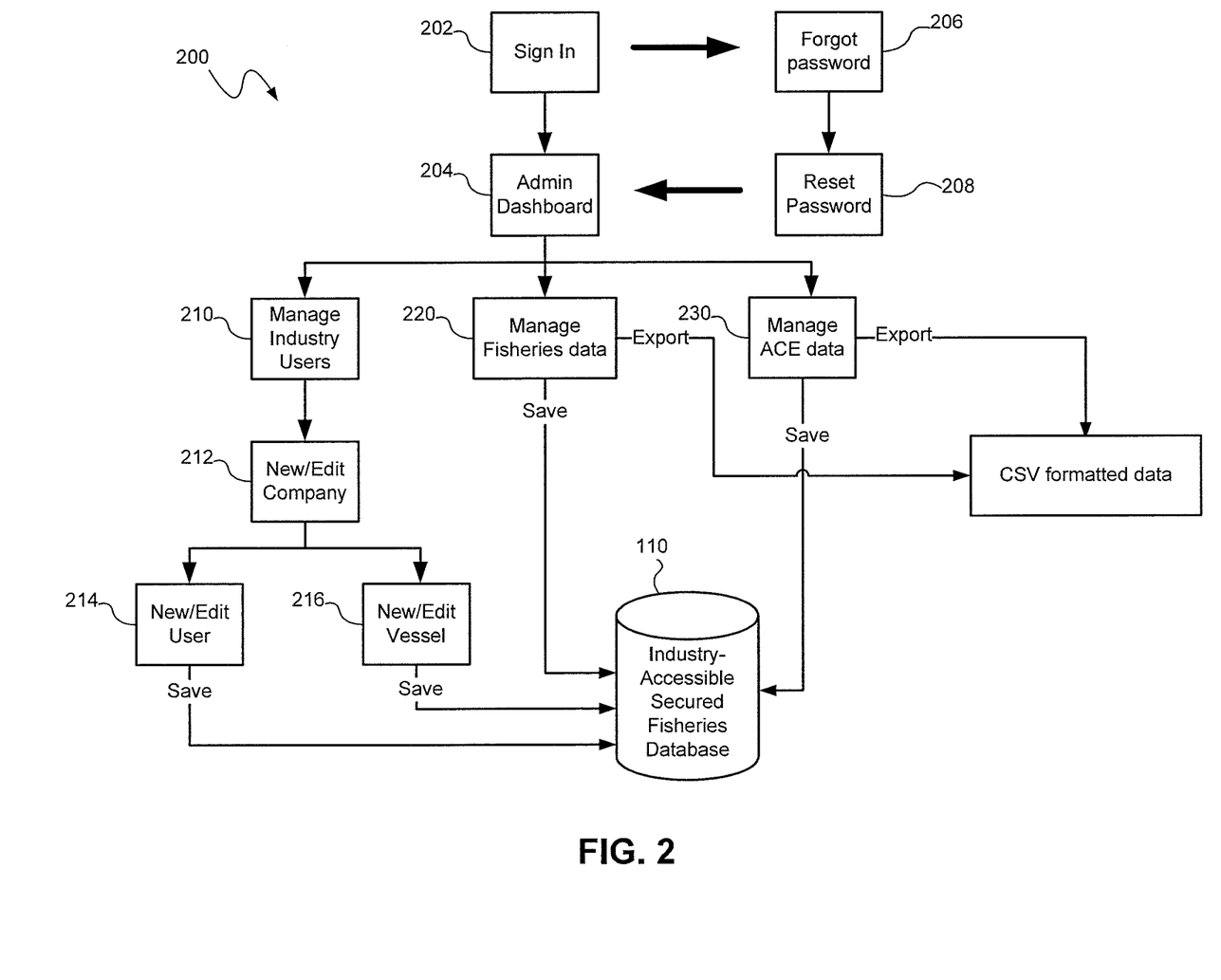
FIG. 2 is a block flow diagram of an administration portal interface to an industry-accessible secured fisheries database, consistent with an embodiment of the present disclosure.

Referring to FIG. 2, one embodiment of an administration portal interface 200 used by a database administrator is described in greater detail. The administration portal interface 200 may be implemented, for example, as a series of interactive forms and/or screens for entering data, displaying data, and activating functions of the administration portal interface 200. Other embodiments of interfaces for administration of the industry-accessible secured fisheries database 110 are also within the scope of the present disclosure.

An administrator may use the administration portal interface 200 to manage a wide range of users of the database 110 and data stored in the database 110. The administration portal interface 200 may be used, for example, to manage all industry users of the industry-accessible secured fisheries database 110, to manage access to the database 110 by third party applications or industry users (e.g., by providing and managing access tokens), and to manage all data uploaded to and exported from the database 110. The administration portal interface 200 may be secured by security measures, such as encryption and controlled access (e.g., password protection). Because a database administrator has broader access to the proprietary data, the administration portal interface 200 may be configured with stronger access control than the industry user interfaces. The administration portal interface 200 may limit access, for example, to permitted IP addresses associated with the authorized administrators.

To gain access to the administration portal interface 200, the administrator provides log in credentials on a sign-in form 202. Once authorized using the administrator's credentials, the administrator is logged in and allowed access to an administrator dashboard screen 204. If the administrator is not authorized due to invalid credentials, the administrator is denied access. If the administrator is not authorized due to a forgotten password, the administrator may request retrieval of his or her password by entering an email address in a forgot password form 206. If the email address matches an email address of an authorized administrator, the administrator is then sent an email with a one-time use tokenized URL to access reset password functionality. The one-time use tokenized URL may then generate a prompt for the administrator to reset his or her password via a reset password form 208. Once authorized using the administrator's new password after reset, the administrator is allowed access to the administrator dashboard screen 204.

The administrator dashboard screen 204 may provide an administrator with usage statistics, reviews of users and data, and links to activate functions to manage users and data. The administrator dashboard screen 204 allows an administrator to activate a manage industry users function, which displays a manage industry users screen 210. The manage industry users screen 210 may provide a sortable and filterable list of industry users of the database 110 (e.g., companies, organizations and individuals at those companies/organizations). The manage industry users screen 210 allows the administrator to activate a new/edit company function, which displays a new/edit company screen 212 for editing existing company/organization records or adding new company/organization records. The new/edit company function may be activated by selecting a company/organization to be edited from the list or by activating a new company link. The manage industry users screen 210 may also contain a search field to allow the administrator to search for records of industry users.

The new/edit company form 212 allows an administrator to manage and/or edit an existing company or organization and may display a list of individual users or vessels associated with the company/organization. The new/edit company form 212 may also include a link for activating a new/edit user function, which displays a new/edit user form 214 for adding or editing individual user records associated with the company/organization. The new/edit company form 212 may also include a link for activating a new/edit vessel function, which displays a new/edit vessel form 216 for adding or editing vessel records associated with the company/organization. The company data, individual user data and vessel data may be saved in the industry-accessible secured fisheries database 110.

The administrator dashboard 204 also allows an administrator to activate a manage fisheries data function, which displays a manage fisheries data screen 220. The manage fisheries data screen 220 allows an administrator to manage the fisheries dependent data that may be used, for example, in a traceability application or a verification application. The manage fisheries data screen 220 may allow the administrator to upload or import fisheries data from a fisheries dependent data source, such as a government database or third party application. The manage fisheries data screen 220 may also allow the administrator to access the fisheries data, which may be sortable and/or filterable (e.g., by company, vessel, species, location and/or date). The manage traceability data screen 220 may further allow the administrator to export fisheries data, for example, to a data format (e.g., CSV formatted data) usable by a third party application such as a traceability application. Traceability data provided in a format usable by a traceability application may be automatically "cleaned" by removing information identifying the source of the traceability data to preserve confidentiality of the fishers associated with that data.

In one embodiment, the administrator dashboard 204 further allows an administrator to activate a manage ACE data function, which displays a manage ACE data screen 230. The manage ACE data screen 230 allows an administrator to access and manage ACE data entered by users. The ACE data may also be sortable and/or filterable (e.g., by company, vessel, species, location and/or date). The manage ACE data screen 230 may also allow the administrator to upload and/or export ACE data similar to the fisheries dependent data.

Figure 3:
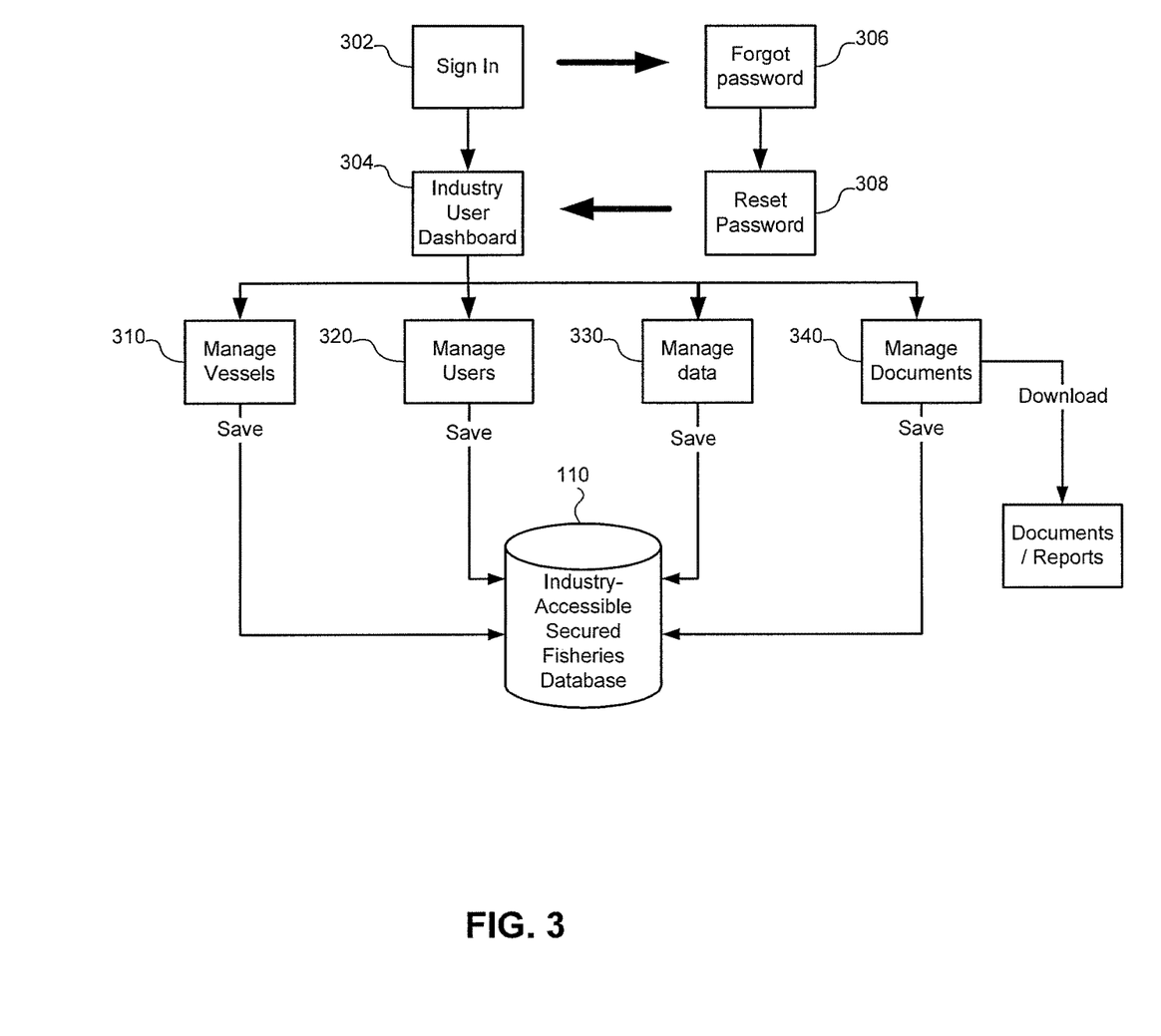
FIG. 3 is a block flow diagram of an industry user interface to an industry-accessible secured fisheries database, consistent with an embodiment of the present disclosure.

Referring to FIG. 3, one embodiment of an industry member interface 300 used by industry members is described in greater detail. The industry member interface 300 may be implemented, for example, as a series of interactive forms and/or screens for entering data, displaying data, and activating functions of the industry member interface 300. Other embodiments of interfaces for industry members to access the industry-accessible secured fisheries database 110 are also within the scope of the present disclosure.

The industry member interface 300 generally allows the industry member user (e.g., an individual at an industry member company or organization) to manage data associated with that industry member (e.g., fisheries dependent data originating from that industry member) and to manage users associated with the industry member (e.g., individual users within that industry member company/organization and/or users of the data generated by that industry member). The industry member interface 300 may be used to add data to the industry-accessible secured fisheries database 110 and to view or correct the data associated with that industry member. The industry member interface 300 also allows the industry member user to generate reports based on the data and to download the resulting report in CSV format, PDF format or other type of electronic data file format. The industry member interface 300 may also be used to administer the credentials of the individual users associated with that industry member.

To gain access to the industry member interface 300, the industry member user provides log in credentials on a sign-in form 302. Once authorized using the user's credentials, the industry member user is logged in and allowed access to the industry user dashboard screen 304. If the industry user is not authorized due to invalid credentials, the industry member user is denied access. If the industry user is not authorized due to a forgotten password, the industry member user may request retrieval of his or her password by entering an email address in a forgot password form 306. If the email address matches an email address of an authorized industry member, the industry member is then sent an email with a one-time use tokenized URL to access reset password functionality. The one-time use tokenized URL can then generate a prompt for the industry member user to reset his or her password via a reset password form 308. Once authorized using the industry member user's new password after reset, the industry member user is allowed access to the industry user dashboard screen 304.

The industry user dashboard screen 304 may provide an industry user with statistics about data in the industry-accessible secured fisheries database 110. These statistics may be aggregated and presented in a way (e.g., according to the Rule of 3) that preserves the confidentiality rights of the fishers associated with data, as described above. In another example, proprietary data may be displayed where the owner of the data (e.g., the fisher) authorizes use of the data in this way. The industry user dashboard screen 304 also allows an industry user to activate functions to manage vessels associated with the industry user, to manage users associated with the industry user, to manage data associated with the industry user, and to manage reports and documentation.

The industry user dashboard screen 304 allows an industry user to activate a manage vessels function, which displays a manage vessels screen 310. The manage vessels screen 310 allows an industry user to manage vessels associated with the industry user organization, for example, by adding and/or editing vessels in a manner similar to the administrator portal interface. The industry user dashboard screen 304 allows an industry user activate a manage users function, which displays a manage users screen 320. The manage users screen 320 allows the industry user to manage users associated with the industry user organization, for example, by adding and/or editing users in a manner similar to the administrator portal interface. The industry user dashboard screen 304 allows an industry user activate a manage data function, which displays a manage data screen 330. The manage data screen 330 allows an industry user to view, sort, filter, edit, and export the data associated with that industry user. The manage data screen 330 may be used, for example, to break down or organize fisheries dependent data by species, date, location and/or vessel. The manage data screen 330 may further be used to export the data associated with that industry user in CSV or other data compilation formats. The data entered using the manage vessels screen 310, the manage users screen 320, and the manage data screen 330 may be saved to the industry-accessible secured fisheries database 110.

The industry user dashboard screen 304 also allows an industry user with the appropriate credentials to activate a manage documents function, which displays a manage documents screen 340. The manage documents screen 340 may provide industry users with access to tools for generating reports and documents. The manage documents screen 340 may also provide industry users with access to previously generated documents. All reports and documents generated using the manage documents screen 340 may be saved to the industry-accessible secured database 110 and/or may be downloaded in PDF format or any other general use file format.

Figure 4:
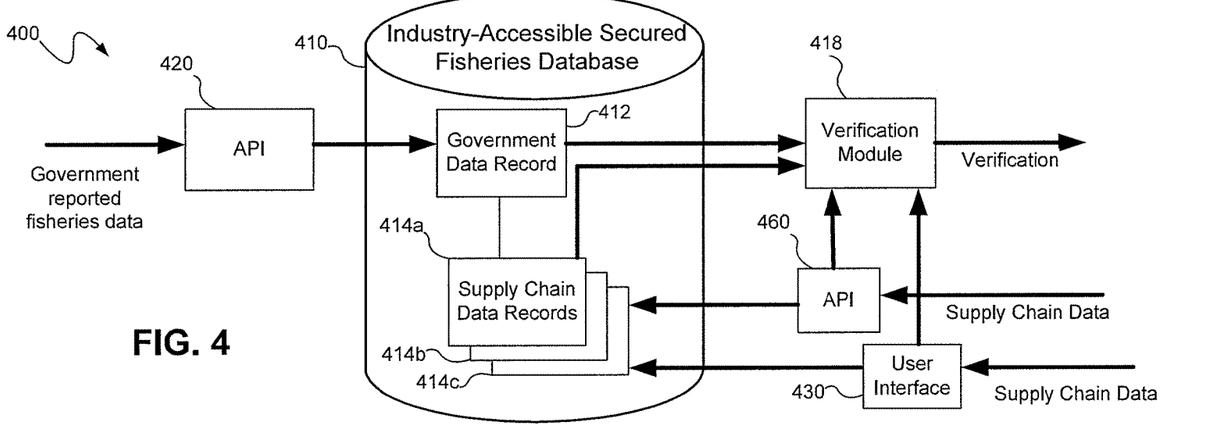
FIG. 4 is a schematic diagram of a system for providing industry access to proprietary fisheries dependent data used for supply chain verification, consistent with embodiments of the present disclosure.
Figure 5:
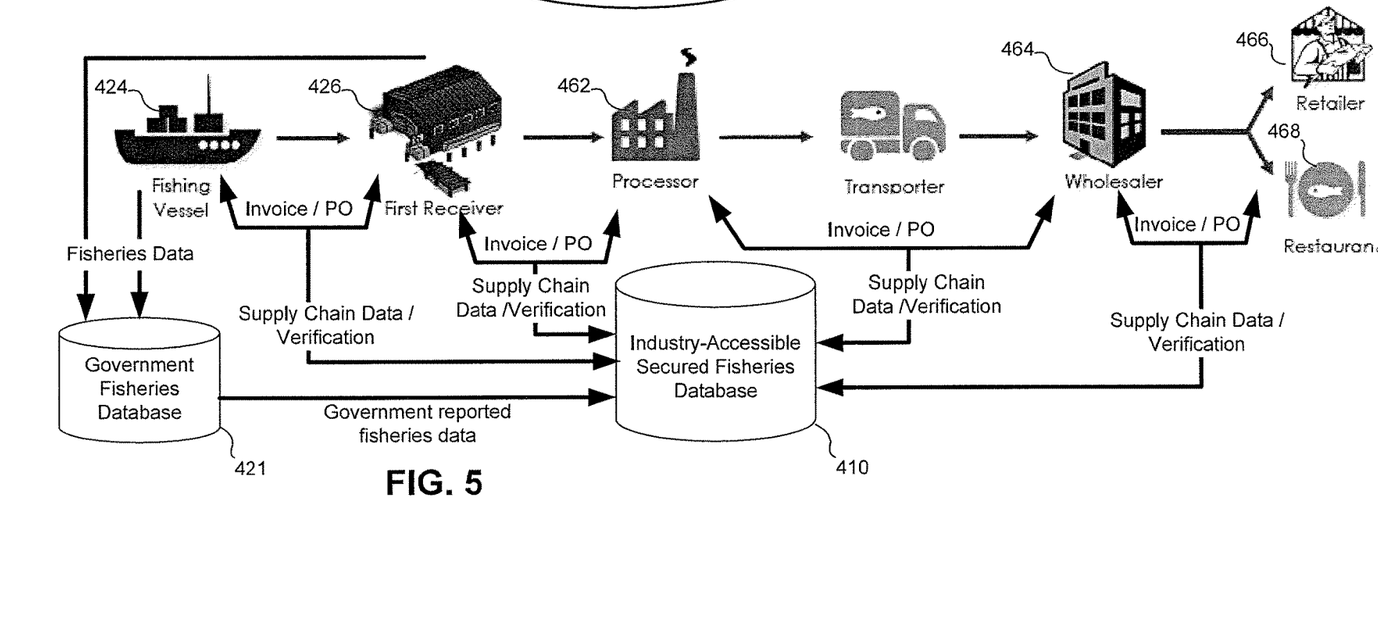
FIG. 5 is a schematic diagram of a method for supply chain verification of fisheries dependent data using an industry-accessible secured fisheries database, consistent with embodiments of the present disclosure.

Referring to FIGS. 4 and 5, one embodiment of a system 400 for providing industry access to proprietary fisheries dependent data may be used for verification of the supply chain data that identifies fish products being sold and purchased by supply chain entities. This embodiment of the system 400 includes an industry-accessible secured fisheries database 410, APIs 420, 460 for transferring data to and accessing data in the database 410, and a verification module 418 for performing a verification function. The industry-accessible secured fisheries database 410 includes government database records 412 created from government reported fisheries data transferred to the database 410 via an API 420. The industry-accessible secured fisheries database 410 also includes supply chain data records 414a, 414b, 414c created from supply chain data entered or transferred to the database 410 by supply chain entities. The supply chain data records 414a, 414b, 414c relate to a particular fish product being sold down a supply chain and may be linked to the government data record 412 associated with that fish product. The supply chain data may be transferred to the database 410 from a software application used by the supply chain entity (e.g., an ERP application) via an API 460 or may be manually entered by the supply chain entity through a user interface 430 to the database 410.

The verification module 418 receives supply chain data (e.g., via the API 460) and verifies the supply chain data against the government data records 412 in the industry-accessible secured fisheries database 410. The verification module 418 may perform this verification function by locating an associated government data record 412 in the database 410 using one or more data components from the supply chain data. In one example, the verification module 418 may use a fish product identifier (e.g., a trip ticket number or unit ID) that is provided in both the supply chain data and the government reported data to locate the associated government data record 412. In another example, the verification module 418 may use a combination of data components capable of identifying the fish product (e.g., vessel ID, species, and weight) and search for the same combination of data components in the government reported fisheries data to locate the associate government data record 412. In a further example, the verification module 418 may use a sales transaction communication identifier (e.g., an invoice number or PO number) to locate the associated government data record 412 through the linked supply chain data records 414a-c.

Once an associated government data record 412 is located, the supply chain data may be verified against the data on that associated government data record 412. In one embodiment, the verification module 418 may search that associated government data record 412 to determine that supply chain data matches the data on the government reported data record 412. Examples of the supply chain data that may be verified include unit ID and sub units, species, product form, dates, catch location, and weight. The verification module 418 may then provide a verification notice to the user at the supply chain entity. In this way, the supply chain data may be verified without revealing the proprietary data in the government data record 412. The verification module 418 may also check the supply chain data from one sales communication against supply chain data on other sales communications related to the same product, for example, to reconcile PO data with invoice data for the same product.

The verification may be performed by the seller, the buyer, or both. The buyer may perform a verification to decide whether or not to accept or reject a fish product. The seller may perform a verification to promote a fish product to prospective sellers by indicating the authenticity of the fish product. The industry-accessible secured fisheries database 410 may be third party accredited by an accrediting authority such that the verification indicates certification of a seafood product by an accredited verification. Accreditation may include ISO accreditation setting specific criteria for the database and auditing the database to verify that these criteria are met.

In another embodiment, the verification module 418 may be used to locate the associated government data record 412 and may provide the data from the associated government data record 412 to the user who is verifying the data for the supply chain entity. The user may then review the data from the associated government data record 412 to verify the supply chain data.

Once the supply chain data has been verified against an associated government data record, one or more supply chain data records 414a-c may be created and linked to the associated government data record 412. If the supply chain data does not match the data of an associated government data record, the supply chain data may be reconciled before creating the linked supply chain data record. This process of transmitting supply chain data to the database 410, verifying the data, and creating supply chain data records in the database 410 may be performed at multiple locations along the supply chain, thereby developing the industry-accessible secured fisheries database 410 with reliable, verified data. By collecting supply chain data from each of the supply chain entities, changes in the product through the supply chain may also be tracked and verified.

FIG. 5 illustrates one example of supply chain data verification. In this example, a fishing vessel 424 catches fish and sells the landed fish to a first receiver 426. The first receiver 426 sells the fish to a processor 462 for processing the fish. The processor 462 sells the processed fish to a wholesaler 464 and the processed fish is transported to the wholesaler 464. The wholesaler 464 then sells the processed fish product to a retailer 466 or a restaurant 468. The fish product may be modified along the supply chain, for example, by dividing the fish product into sub units and/or changing the product form during processing. Each purchase/sale of the fish product through the supply chain involves one or more sales transaction communications between the supply chain entities, and the sales transaction communications include data identifying the product sold and its source. The sales transaction communications may include, for example, an invoice generated and transmitted by a seller and/or a purchase order generated and transmitted by the buyer. The invoices and purchase orders may be generated and transmitted using ERP software.

The fishing vessel 424 reports the data for the landed fish to a government fisheries database 421, for example, using an electronic logbook application or through a trip ticket system. This government reported fisheries data is then transferred to the industry-accessible secured fisheries database 410 via the API 420. The data reported to the government fisheries database 421 by the fishing vessel 424 may include information about the fishing vessel and catch as well as information about the first receiver. The information about the fishing vessel and catch may include, for example, vessel call sign, vessel ID, individual fisher identifier, trip ticket number, unit ID, unit type, net weight, species, area or location of catch, date sailed, date landed, location landed, fishing method, stowage method, stowage temperature record, and sale disposition. The information reported about the first receiver may include the first receiver business name, address, country, and national ID number.

In another embodiment, this fisheries data may be reported to the government fisheries database 421 by the first receiver 426 instead of or in addition to the fishing vessel 424. In the case where the first receiver reports the same or similar data to the government fisheries database 421, the data may also include additional information such as temperature when received, temperature record, product form, price, grade, market size and data and time of dispatch. In a further embodiment, this fisheries data may be transmitted directly to the industry-accessible secured fisheries database 410, for example, concurrently with reporting to the government fisheries database 421.

When the fishing vessel 424 sells the fish product to the first receiver 426, a sales transaction communication may be issued, for example, an invoice may be issued by the fishing vessel 424 and/or a purchase order (PO) may be issued by the first receiver 426. The sales transaction communication(s) includes supply chain data identifying the fish sold from the vessel to the first receiver and the source of that fish. An invoice issued by the fishing vessel 424 may include, for example, an invoice number, associated PO number, vessel name, vessel ID, trip ticket number, fisher business address, species, product form, net weight, price, grade, and first receiver information. A PO issued by the first receiver 426 may include, for example, a PO number, an associated invoice number, vessel name, vessel ID, trip ticket number, vessel business address, species, product form, net weight, price, grade, and first receiver information.

All or a portion of the supply chain data from the invoice issued by the fisher 424 and/or the PO issued by the first receiver 426 (or other sales transaction communication) may be transmitted (e.g., from an ERP application) to the industry-accessible secured fisheries database 410 for verification and for creating supply chain data records. In this example, a trip ticket number from the invoice and/or PO may be used to locate an associated government data record, and components of the supply chain data from the invoice and/or PO (e.g, net weight, species, catch location) may then be verified against the data on this associated government data record. In other embodiments (e.g., where a trip ticket number is not used), the government data may be searched using supply chain data such as catch data (e.g, date landed, species, weight, vessel ID) from the invoice/PO to narrow down the government data records until the associated government data record is located. Once the initial sales transaction communication(s) are linked to the associated government record, a unique identifier (e.g., a unit ID) may be used to reference all future trades or transactions for this particular lot of product. If the product is subsequently divided, additional identifiers (e.g., sub unit IDs) may be created and linked to the original identifier.

When the first receiver 426 sells the fish to a processor 462, an invoice may be issued by the first receiver 426 and/or a PO may be issued by the processor 462. The invoice issued by the first receiver 426 may include invoice number, associated PO number, unit ID, first receiver information, current date, date landed, vessel identifier, species, product form, net weight, price, grade, and processor information (e.g., business name, address, country, and ID number). The PO issued by the processor 462 may include, for example, PO number, associated invoice number, first receiver information, unit ID, species, product form, net weight, price, grade, and processor information.

All or a portion of the supply chain data from the invoice issued by the first receiver 426 and/or the PO issued by the processor 462 may be transmitted (e.g., from an ERP application) to the industry-accessible secured fisheries database 410 for verification and for creating supply chain data records. In this example, the unit ID from the invoice and/or PO may be used to locate an associated government record, for example, by first locating a supply chain data record from the previous transaction with the same unit ID and determining the associated government data record linked to that previous supply chain data record. Alternatively, the supply chain data from the invoice/PO may be used to search for matching government data records. Components of the supply chain data from the invoice and PO (e.g, net weight and species) may then be verified against the data on the associated government data record.

This process may be repeated with each sales transaction when the product is sold from the processor 462 to the wholesaler 464 and when the product is sold from the wholesaler 464 to a retailer 466 or restaurant 468. Each invoice/PO, for example, may include the unique identifier (e.g., unit ID) that links back to supply chain data records created from previous invoices/POs and eventually back to the associated government data record. In addition or in the alternative, supply chain data from the invoices/POs may be used to search the government data records to locate the matching government data record. Each of the supply chain entities 426, 462, 464, 466, 468 may verify the fish product as a buyer to determine whether or not to accept the product and may verify the fish product as a seller to promote the product as authenticated.

Although this example of supply chain verification uses data from sales transaction communications, each supply chain entity may also enter supply chain data independent of the sales transaction communications to perform a verification (e.g., using a user interface). This supply chain data entered by a supply chain entity may include information about the fish product being handled by that supply chain entity, information about a previous handler of the fish product, information about the current handler of a fish product, and information about the next handler of a fish product. The information about the fish product being handled by the supply chain entity may include, for example, date and time of reception, unit ID, list of unit IDs contained in a new unit, temperature when received, temperature record, product form, product type, unit type, net weight, date and time of dispatch, and date and time of production.

The information about the fish product being handled by the supply chain entity may be different for each supply chain entity because the fish product changes form through the supply chain. The weight of the fish product may change, for example, when the fish is divided into sub units and/or when the fish is processed by the processor. The supply chain data may include data identifying the product changes, and the verification process may account for and verify these product changes. To verify the weight when a fish product has been divided, for example, the weight of the sub units may be added and checked against the original recorded weight.

Although examples of supply chain verification are described above, other methods of supply chain verification are contemplated and within the scope of the present disclosure.

Figure 6:
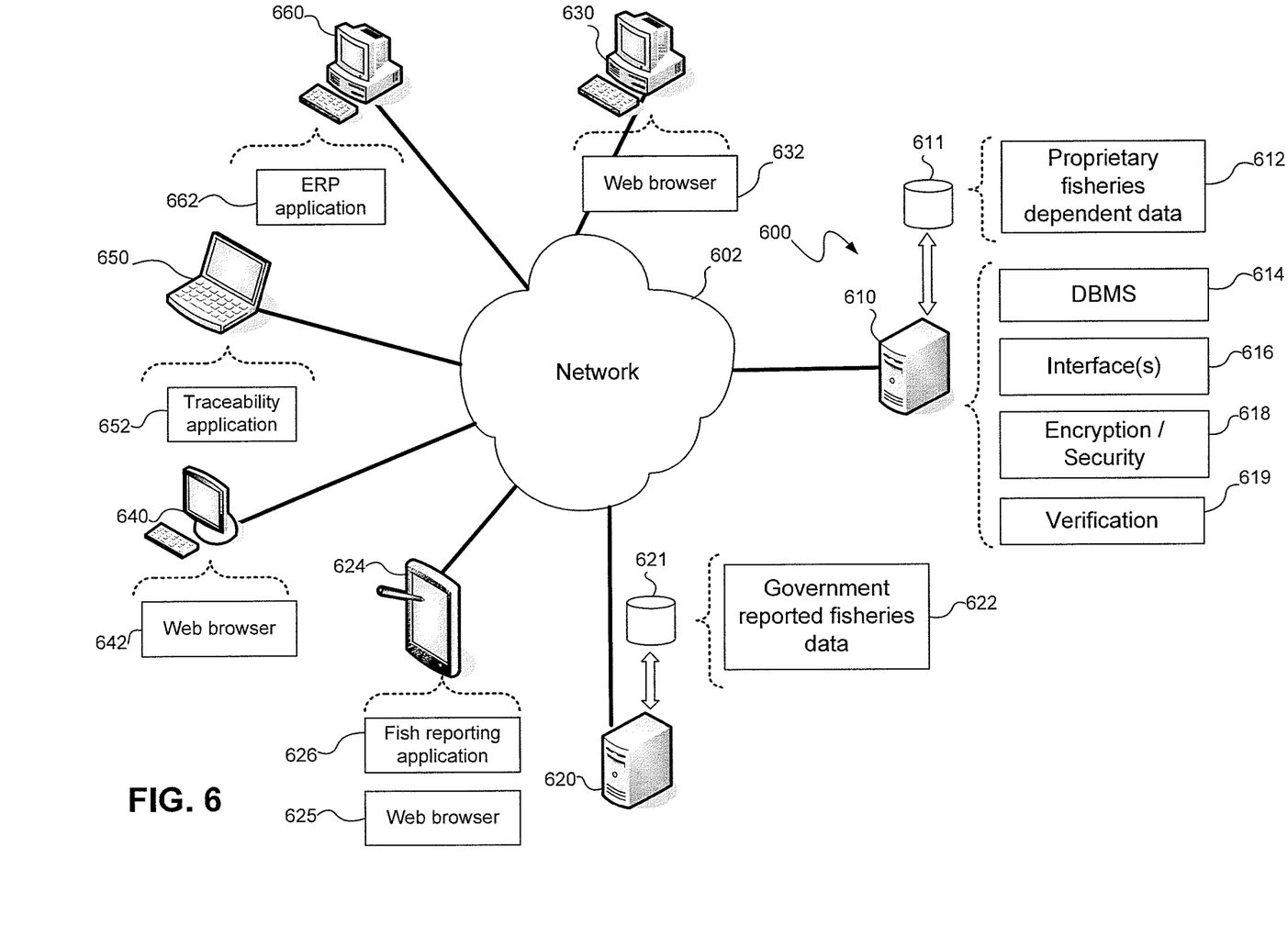
FIG. 6 is a schematic diagram of a network implementation of a system for providing industry access to proprietary fisheries dependent data while preserving confidentiality rights of fishers, consistent with embodiments of the present disclosure.

Referring to FIG. 6, one embodiment of a system 600 for providing industry access to proprietary fisheries dependent data while preserving confidentiality may be accessed over a computer network 602 such as the Internet. In this embodiment, the system 600 may be implemented using one or more computer systems 610 coupled to the network 602. The computer system 610 may include one or more data storage systems 611 for storing the data described herein such as the proprietary fisheries dependent data 612. The computer system 610 also executes software to perform the functions described herein such as database management system (DBMS) software 614, interface software 616 for providing user interfaces and APIs, encryption and security software 618 for providing the security measures described herein, and verification software 619 for providing the verification functions described herein. An embodiment of the industry-accessible secured fisheries database includes the proprietary fisheries dependent data 612 stored on the storage system 611 and the DBMS software 614 executing on the computer system 610.

The government fisheries database may also include one or more computer systems 620 connected to the computer network 602. The government database computer system 620 includes one or more data storage systems 621 for storing the government reported fisheries data 622 and executes software for receiving and providing access to that data. The government reported fisheries data 622 may thus be transferred over the network 602 from the government database computer system 620 to the industry-accessible database computer system 610.

The system 600 for providing industry access to proprietary fisheries dependent data may be accessed by the various users using computing devices 624, 630, 640, 650, 660 connected to the network 602. These computing devices may include, without limitation, personal computers, laptop computers, tablet computers, and smart phones. A computing device 624 may be used by a fisher or first receiver to upload fisheries data to the government database computer system 620 and/or to the industry-accessible database computer system 610. The computing device 624 may include a fish reporting software application 626 to upload this data and/or may include a web browser 625 for accessing a web site to upload this data.

Computing devices 630, 640 may also be used by database administrators and industry member users to access the industry-accessible database computer system 610 over the network 602. These computing devices 630, 640 generally include web browsers 632, 642 for accessing websites and web based forms that provide the administrator and industry member user interfaces.

Computing devices 650, 660 may also be used by industry members to connect third party software applications to the industry-accessible database computer system 610 over the network 602. The computing device 650 includes a traceability application 652 that connects to the industry accessible database computer 610 to access the proprietary fisheries data for traceability applications. The computing device 660 includes an ERP application 662 that connects to the industry accessible database computer 610 to access the proprietary data for uploading supply chain data and performing supply chain data verification.

Figure 7:
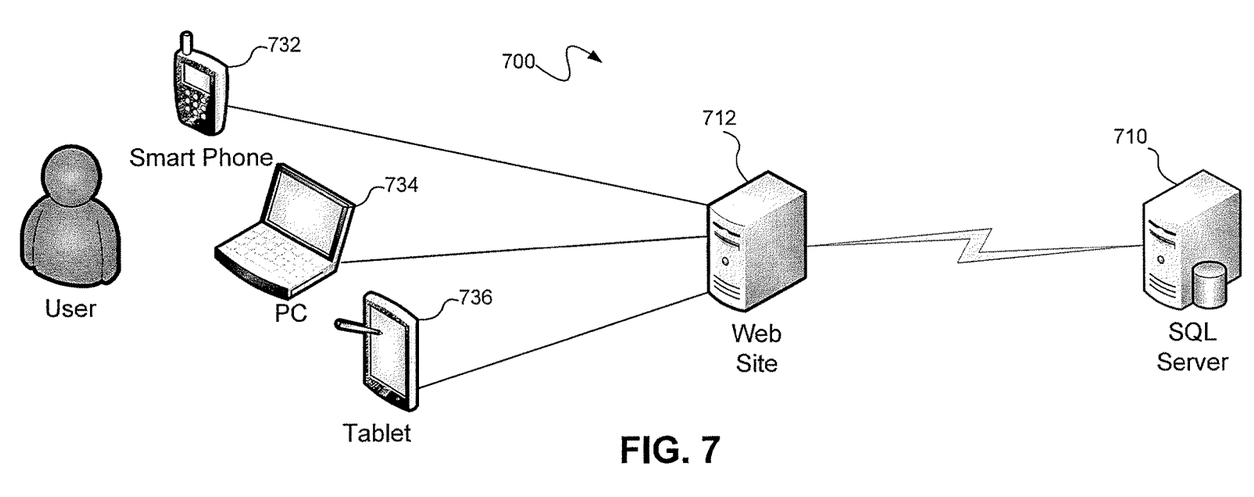
FIG. 7 is a schematic diagram of a cloud computing platform implementation of a system for providing industry access to proprietary fisheries dependent data while preserving confidentiality rights of fishers, consistent with embodiments of the present disclosure.

As shown in FIG. 7 the system for providing industry access to proprietary fisheries-dependent data while preserving confidentiality may be implemented using a platform as a service (PaaS) cloud computing platform 700 such as the type known as Microsoft® Azure®. In this embodiment, the industry-accessible secured fisheries database may be established using an SQL server 710 such as a Microsoft® SQL server. The interfaces to the industry-accessible secured fisheries database and the other functionality performed by the system for accessing the database may be established through websites (e.g., Microsoft® Azure® websites)

hosted by a web server 712. Users may access the database in the SQL server 710 by connecting to a website provided by the web server 712 with different types of user devices such as a smart phone 732, a PC 734, and a tablet computer 736.

Figure 8:
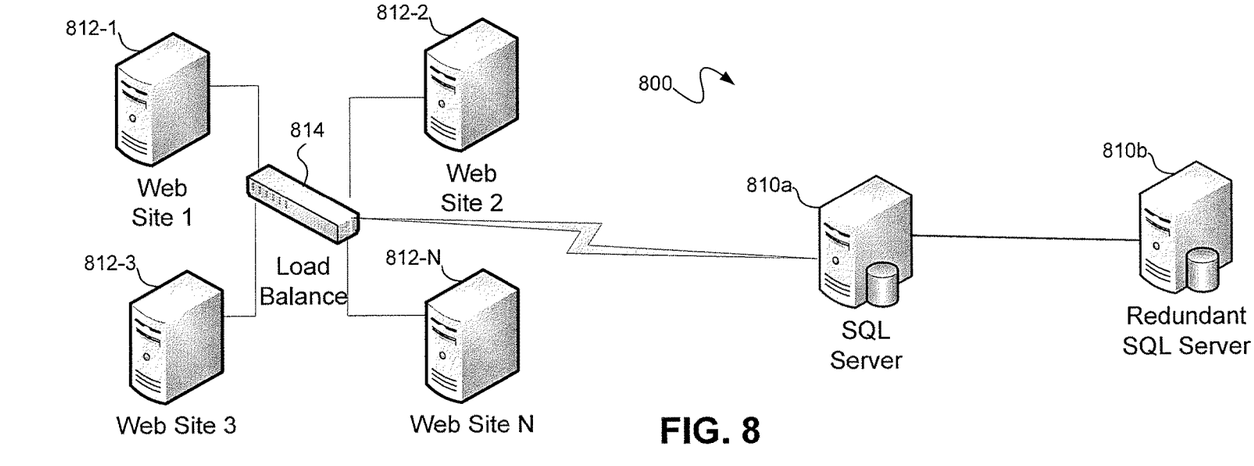
FIG. 8 is a schematic diagram of a scaled cloud computing platform implementation of a system for providing industry access to proprietary fisheries dependent data while preserving confidentiality rights of fishers, consistent with embodiments of the present disclosure.

As shown in FIG. 8, a cloud computing platform 800 may be scaled to accommodate an increase in data storage and user traffic. The scaled cloud computing platform 800 includes redundant SQL servers 810a, 810b and multiple web servers 812-1 to 812-n coupled to a load balancer 814. Users may continue to access the database in the same way through websites hosed by any of the multiple web servers 812-1 to 812-n.

Accordingly, systems and methods, consistent with embodiments described herein, may use an industry-accessible secured fisheries database to provide industry access to proprietary fisheries dependent data while preserving confidentiality rights of the fishers who generate proprietary data. The industry access may be used, for example, for purposes of traceability of seafood and verification of supply chain data used to identify fish products in the supply chain.

Consistent with an embodiment, a method provides industry access to proprietary fisheries dependent data associated with a plurality of fishers. The method includes: providing at least one industry-accessible secured fisheries database for storing proprietary fisheries dependent data associated with a plurality of fishers; receiving proprietary fisheries dependent data reported by at least one fisher, wherein the fisheries dependent data includes data related to catching, taking or harvesting fish; storing the proprietary fisheries dependent data in the industry-accessible secured fisheries database; and providing industry members with access to the proprietary fisheries dependent data stored in the industry-accessible secured fisheries database while preserving confidentiality rights of the fishers.

Consistent with another embodiment, a method is provided for supply chain verification of fisheries dependent data. The method includes: generating or receiving a sales transaction communication in connection with sale of a fish product, wherein the sales transaction communication includes supply chain data generated by a supply chain entity to identify the fish product and a source of the fish product; accessing a industry-accessible secured fisheries database including proprietary fisheries dependent data obtained from a government fisheries database, wherein the proprietary fisheries dependent data includes government reported data collected by the government fisheries database pursuant to a fishery regulating authority; and verifying the supply chain data against the government reported data in the industry-accessible secured fisheries database.

Consistent with a further embodiment, a system provides access to proprietary fisheries dependent data associated with a plurality of fishers. The system includes an industry-accessible secured fisheries database for storing proprietary fisheries dependent data associated with a plurality of fishers. The system also includes an application programming interface (API) for receiving proprietary fisheries dependent data reported by at least one fisher and storing the proprietary fisheries dependent data in the industry-accessible secured fisheries database. The fisheries dependent data includes data related to catching, taking or harvesting fish. The system further includes an industry member interface for providing industry members with access to the proprietary fisheries dependent data stored in the industry-accessible secured fisheries database while preserving confidentiality rights of the fishers.

Consistent with yet another embodiment, a computer program product embodied on a non-transitory, computer-readable storage medium has instructions stored thereon for execution by a processor to perform the operations comprising: receiving proprietary fisheries dependent data reported by at least one fisher, wherein the fisheries dependent data includes data related to catching, taking or harvesting fish; storing the proprietary fisheries dependent data in a industry-accessible secured fisheries database; and providing industry members with access to the proprietary fisheries dependent data stored in the industry-accessible secured fisheries database while preserving confidentiality rights of the fishers.

As will be appreciated by one skilled in the art, embodiments of the present disclosure may include methods, systems, or computer program products. Accordingly, embodiments of the present invention may take the form of hardware, software, firmware, or any combination thereof, which may generally be referred to herein as a "circuit," "module" or "system." Furthermore, embodiments of the present disclosure may take the form of a computer program product on a tangible, non-transient computer-usable storage medium having computer-usable program code embodied in the medium.

Any suitable computer usable or computer readable medium may be utilized. The computer readable medium may be, for example but not limited to, an electronic, magnetic, optical, electromagnetic, infrared, or semiconductor system, apparatus, device, or tangible propagation medium. More specific examples (a non-exhaustive list) of the computer-readable medium would include the following: an electrical connection having at least one wire, a portable computer diskette, a hard disk, a random access memory (RAM), a read-only memory (ROM), an erasable programmable read-only memory (EPROM) or Flash Memory, an optical fiber, a portable compact disc read-only memory (CD-ROM), an optical storage device, a transmission media such as those supporting the Internet or an intranet, or a magnetic storage device.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for supply chain verification of proprietary fisheries dependent data by upstream supply chain entities, the method comprising:
    establishing a secure connection to an industry-accessible secured fisheries database and securely transferring proprietary fisheries dependent data to the industry-accessible secured fisheries database, wherein the proprietary fisheries dependent data includes at least a subset of government reported data that is collected by a government fisheries database pursuant to a fishery regulating authority and is protected as confidential under law or a government regulation, wherein the industry-accessible secured fisheries database is secured using at least one of encryption and access control to preserve the confidentiality of the proprietary fisheries data;

generating or receiving a sales transaction communication in connection with sale of a fish product, wherein the sales transaction communication includes supply chain data generated by a downstream supply chain entity to identify the fish product and a source of the fish product;

establishing a secure connection between a downstream supply chain entity and the industry-accessible secured fisheries database for providing access to the proprietary fisheries dependent data while preserving confidentiality rights of the fishers and for storing supply chain data associated with the proprietary fisheries dependent data, wherein the secure connection to the industry-accessible secured fisheries database is established using at least one of a user interface and an application programming interface (API) to allow secure access while preserving the confidentiality rights of the fishers;

searching the industry-accessible secured fisheries database using the at least one of the user interface and the application programming interface (API) to verify the supply chain data against the proprietary fisheries dependent data including the government reported data in the industry-accessible secured fisheries database, without the downstream supply chain entity accessing the government fisheries database; and generating a verification notice for the downstream supply chain entity, wherein the verification notice provides verification of supply chain data without disclosing the proprietary fisheries dependent data to the downstream supply chain entity.

2. The method of claim 1 wherein searching the industry-accessible secured fisheries database includes obtaining access to the government reported data matching the supply chain data.

3. The method of claim 1 wherein the sales transaction communication includes at least one of an invoice and a purchase order.

4. The method of claim 1 wherein the supply chain data includes at least a vessel ID, a species of the fish, and an amount of the fish.

5. The method of claim 1 further comprising storing the supply chain data in the industry-accessible secured fisheries database with associated proprietary fisheries dependent data.

6. The method of claim 1 wherein securely transferring the proprietary fisheries dependent data to the industry-accessible secured fisheries database includes transferring the proprietary fisheries dependent data from the government fisheries database to the industry-accessible secured fisheries database.

7. The method of claim 1 wherein securely transferring the proprietary fisheries dependent data to the industry-accessible secured fisheries database includes transferring the proprietary fisheries dependent data from an electronic fisher reporting application to the industry-accessible secured fisheries database.

8. The method of claim 1 wherein securely transferring the proprietary fisheries dependent data to the industry-accessible secured fisheries database includes transferring the proprietary fisheries dependent data from an electronic first receiver reporting application to the industry-accessible secured fisheries database.

9. The method of claim 1 further comprising:
establishing at least one industry member interface in communication with the industry-accessible secured fisheries database, wherein the industry member interface is configured to allow an industry member to access the proprietary fisheries dependent data while preserving confidentiality rights of the fishers.

10. The method of claim 1 further comprising:
establishing at least one administration portal interface in communication with the industry-accessible secured fisheries database, wherein the administration portal interface is configured to allow an administrator to manage the industry-accessible secured fisheries database and users of the industry-accessible secured fisheries database.

11. The method of claim 1 wherein establishing the secure connection between the supply chain entity and the industry-accessible secured fisheries database includes establishing an application programming interface (API) between the industry-accessible secured fisheries database and a traceability application for purposes of obtaining traceability data from the secure fisheries database.

12. The method of claim 1 wherein establishing the secure connection between the supply chain entity and the industry-accessible secured fisheries database includes establishing an application programming interface (API) between an enterprise resource planning (ERP) application operated by the supply chain entity and the industry-accessible secured fisheries database.

13. The method of claim 1, wherein the proprietary fisheries dependent data includes at least a vessel ID, a species of the fish, an amount of the fish, and a fishing location.

14. The method of claim 1, wherein the proprietary fisheries dependent data includes data collected from a fishing vessel pursuant to a fishery regulating authority.

15. The method of claim 1, wherein the proprietary fisheries dependent data includes data collected from a first receiver pursuant to a fishery regulating authority.

16. The method of claim 1, wherein providing access to the proprietary fisheries dependent data while preserving confidentiality rights of the fishers includes obtaining consent from a fisher before disclosing proprietary fisheries dependent data associated with the fisher.

17. The method of claim 1, wherein providing access to the proprietary fisheries dependent data while preserving confidentiality rights of the fishers includes disclosing only non-proprietary data.

* * * * *